(12) United States Patent
Pizmony

(10) Patent No.: US 7,766,796 B2
(45) Date of Patent: Aug. 3, 2010

(54) FRAMEWORK SYSTEM

(75) Inventor: Nir Pizmony, Melbourne (AU)

(73) Assignee: Toymonster Limited, Melbourne (AU)

( * ) Notice: Subject to any disclaimer, the term of this patent is extended or adjusted under 35 U.S.C. 154(b) by 0 days.

(21) Appl. No.: 12/295,655

(22) PCT Filed: Jan. 31, 2006

(86) PCT No.: PCT/AU2006/000112

§ 371 (c)(1), (2), (4) Date: Oct. 1, 2008

(87) PCT Pub. No.: WO2006/079182

PCT Pub. Date: Aug. 3, 2006

(65) Prior Publication Data

US 2009/0176622 A1 Jul. 9, 2009

(30) Foreign Application Priority Data

Jan. 31, 2005 (AU) ............................... 2005900401

(51) Int. Cl.
*A63B 21/00* (2006.01)
(52) U.S. Cl. ........................................ 482/35; 482/371
(58) Field of Classification Search .................. 482/23, 482/35–41; 452/998; 449/437; 52/655.2, 52/81.1, 81.2; 403/172, 176
See application file for complete search history.

(56) References Cited

U.S. PATENT DOCUMENTS

| 4,097,043 | A | | 6/1978 | Rudy | |
|---|---|---|---|---|---|
| 4,379,649 | A | * | 4/1983 | Phillips | 403/172 |
| 4,474,490 | A | * | 10/1984 | Harper, Jr. | 403/218 |
| 4,491,437 | A | * | 1/1985 | Schwartz | 403/172 |
| 4,905,443 | A | | 3/1990 | Sutcliffe et al. | |
| 6,117,054 | A | * | 9/2000 | Soltanpour | 482/83 |
| 6,413,004 | B1 | * | 7/2002 | Lin | 403/176 |

FOREIGN PATENT DOCUMENTS

| GB | 2006297 A | 5/1979 |
|---|---|---|
| JP | 7039604 | 2/1952 |

* cited by examiner

*Primary Examiner*—Jerome Donnelly
(74) *Attorney, Agent, or Firm*—Alan Kamrath; Kamrath & Associates PA

(57) ABSTRACT

A load bearing framework system (11) for use as ready to assemble playground equipment constructed of a plurality of connector rods (31, 32) having fixed lengths and one or more adjustable length rods (33) and a plurality of connectors (21, 22, 23, 24) with angular spaced radially extending fingers and a camber angle to a plane normal to the axis of the connector, the fingers shaped relative the end of the connector rods allowing connection of a plurality of the connectors rods. The framework forms an interconnected geometric shaped unit with a substantially planar base of regular closed geometric shape for resting on the ground and an interconnected substantially hemispherical top shape. Detent means can retain connector rods and connectors together.

17 Claims, 10 Drawing Sheets

FRAMEWORK SYSTEM

FIELD OF THE INVENTION

The present invention relates to a framework system for use in creating a climbing frame or play enclosure for children. The framework system is particularly for use in construction by a final consumer on behalf of the children and can be of various sizes, which can be built up using a number of lengths of metal or plastic tubes or rods and novel connectors.

THE PRIOR ART

It is known but not commonly known to construct a heavy-duty frame structure that utilises lengths of square cross-section metal tubing, which are connected by means of a limited range of connectors each comprising a central body having two or more projections inserted into the ends of lengths of tubes to form a joint therebetween. The range of connectors includes 90-degree joints, T joints and corner joints, all requiring tubes to be joined at right angles. This use of right angles limits the frameworks to being of rectangular configuration.

The provision of a wider range of connectors is made difficult by the need to provide projections for all the required angles and to provide a connector, which is dedicated to a particular type of joint.

However of primary concern is that such connectors are generally metal prongs which frictionally and tightly fit into the square metal tubes to form rectangular shelving structures on which loads are supported. This known prior art system therefore does not allow forces in various directions without prospect of accidental disassembly as required for climbing structures and does not allow ready construction and deconstruction.

OBJECT OF THE INVENTION

It is an object of the present invention to overcome or at least ameliorate the problems of the prior art.

It is another object to provide an improved connector and interconnecting tube system, which can be used to form a framework system that will not accidentally disassemble.

It is a further object of the invention to provide a predetermined limited range of connectors and limited number of lengths of interconnecting tubes, which can be combined with each other to build up specific shaped frameworks that are able to be a climbing frame or play enclosure for children.

SUMMARY OF THE INVENTION

According to the invention there is provided a framework system comprising a plurality of cylindrical connector rods having predetermined fixed lengths; a plurality of connectors with angular spaced radially extending fingers and camber angle to a plane normal to the axis of the connector, the fingers allowing connection to the connectors rods.

A plurality of connector rods can be attached to a plurality of connectors connected to the ends of other connector rods to form an interconnected geometric shaped unit with base of substantially regular geometric shape for resting on the ground and an interconnected substantially hemispherical top shape wherein the continuous base and interconnected geometric top shape provide structural integrity to the framework system.

The framework system can use one or more adjustable length connector rods to fit between connectors and allow fitting of final connectors and adjustment to ensure a rigidity and structural integrity of continuous base and interconnected geometric top shape.

The connectors can be retained in connection with the connector rods by interconnecting detent means. The connector rods can be of a lightweight material with sufficient load bearing capacity but could be at least partially flexible and the connectors with the detent means interconnect sufficiently at each end with the connector rods to retain the interconnection of the continuous base and interconnected geometric top shape.

Also according to the present invention, there is provided a connector for use in creating a framework having a particular shaped framework formed by a plurality of connectors and a plurality of detachable connecting cylindrical rods for connecting between spaced connectors, the connector having a body portion having a plurality of emanating fingers with each finger having a shape able to interfit with the end of a connecting cylindrical rod; and each finger further having a spring mounted detent allowing for sliding of the finger into engagement with the end of the connecting cylindrical rod and receiving of the detent into a recess or opening at the end of the connecting cylindrical rod for selectively retaining the connection of the connecting cylindrical rod with the connector.

Preferably the fingers are sized to fit within the end of hollow ended connecting cylindrical rods. The rods can have a circular cross section and the fingers can be formed to fit within the circular cross section.

The detent means can be a protruding button able to interfit into a recess or opening in the hollow ended connecting cylindrical rods.

It can be seen that an important aspect of the connector is the detent means if the connecting cylindrical rods are to be allowed to be at least partially flexible. This avoids the need to avoid any flex and thereby avoids having to use heavy duty steel piping. The detent means will prevent the rod slipping off the finger to cause accidental disassembly. Therefore the connector allows construction of a safe climbing frame for children.

The connector in a particular form comprises a central circular shaped body with the fingers radially emanating at predefined radial angle between fingers and each finger at a predefined constant camber angle from a plane normal to the axis of the central circular shaped body. The central shaped body can be a substantially hemispherical shape.

An important result of this form of the connector is that the connector will have a consistent form regardless of the number of emanating fingers to allow a structure using a number of connectors with a different number of fingers to form an apparent uniform look.

A connector can have a plurality of fingers. In various forms there are two, three, four, five or six fingers to accommodate a variety of angles of interconnection of cylindrical connecting rods. It can include fingers protruding at inter radial angle of 72°, 60° or 45° in order to form substantially pentagonal, hexagonal or octagonal based frameworks respectively. Other predetermined angles can be used for other predetermined shaped framework.

The plurality of fingers on a single connector can emanate from the connector body at a constant camber angle. This camber angle for each finger is a consistent angle to a plane normal to the axis of the central circular body and can be of the order of 15° to 30°.

The fingers can protrude from a circumferential part of the central circular shaped body. However, preferably the fingers include a portion of ribbing extending radially from a more central portion of the inner side of the hemispherical shape. In this way the linear radially extending fingers including the ribbing and the hemispherical shape form a strong low weight connector with strength both along the radial direction and between the radial directions of the fingers.

The detent can be achieved by means of a resilient means mounted between radially extending ribbing of the fingers and connected to a protruding button which can extend outwardly from the cylindrical circumferential extremities of the finger to engage an opening in the side of a hollow cylindrical end of connecting rod, thus preventing relative sliding movement of the rod and finger of the connector for accidental disassembly.

The resilient means can be a spring means. The spring means can be a folded plastic element having an acute expanded angle as the rest position but the material allowing resilient compression to a compressed angle until released. Each finger can include a ribbing structure for receiving therebetween in sliding mode said folded plastic element.

The connector can include an opening for receiving a plug or extension member. In one form the opening is centrally located in the connector body with peripherally emanating fingers.

The plug insertion into the connector opening can be a cover disc mounted on a neck portion that can frictionally interfit in the centrally located connector opening. The plug insertion can further have a cylindrical body sized smaller than the cover disc and the frictional engaging neck and having spaced longitudinal slits to form resilient deformable legs. The legs can assist in resiliently holding material in the connector opening.

It can be seen that an important aspect of the connector is the central connector opening and plug means as it allows for selective connections and prevents openings being left which can cause injury to children allows construction of a safe climbing frame for children. However another fundamental advantage is that the plug can frictionally hold material such that the framework can provide a skeleton that is covered by material, which is held in place and provides shaped play enclosure for children. By particular printed material a theme structure can be readily constructed.

Another importance of the connector opening is for receiving collapsible framework with material attached. In this way an extension upwardly of the framework remains safe in that the collapsible framework readily expands to provide a shaped enclosure but upon any weight will collapse and therefore not provide an extension of the structure for further climbing.

The opening of connectors the framework system can be of a form that selectively can receive any one of a plug, an extension elbow or a collapsible framework. However in another form the connector opening could be able to only receive a plug or a collapsible framework. In this way the framework structure cannot be extended upwardly to cause a structure which no longer has sufficient base stability and is of a height that is dangerous if children fall.

Also according to the invention there is provided a framework system comprising a plurality of first cylindrical connector rods having a first length; a plurality of second cylindrical connector rods having a second length; a plurality of third adjustable connector rods having an adjustability of length around a third length; a plurality of first connectors with constant angular spaced radially extending fingers and constant camber angle to a plane normal to the axis of the connector, the fingers allowing connection to the connectors rods; a plurality of second connectors being interconnection connectors with angular spaced radially extending fingers and constant camber angle to a plane normal to the axis of the connector, the fingers allowing connection to the connectors rods; a plurality of third connectors being base connectors having a plurality of angular spaced radially extending fingers emanating from one side of the connector and constant camber angle to a plane normal to the axis of the connector, the fingers allowing connection to the connectors rods; one or more fourth connectors being top connectors having a plurality of angular spaced radially extending fingers emanating from central body with a constant camber angle to a plane normal to the axis of the connector, the fingers allowing connection to the connectors rods.

The framework system allows a plurality of first connector rods to be attached to a first connector and a plurality of second and third connectors connected to the ends of the first connector rods and connected therebetween by a plurality of second connector rods to form a geometric shaped unit with base connectors at the base of the geometric shape for resting on the ground; and interconnecting connectors allowing a plurality of said geometric shaped units to interconnect laterally wherein the constant camber forms an enclosed framework shape; and allowing for third adjustable connector rods to fit between the base connectors of adjacent geometric shaped units to form a continuous enclosed linear base extending in a plane; and allowing for one or more fourth top connectors to connect a top portion of the adjacent geometric shaped units to form a united top shape; wherein the continuous base and interconnected geometric shaped units and the united top shape provide structural integrity to the framework system.

The connectors can be retained in connection with the connector rods by interconnecting detent means.

The shaped unit can be a hexagon and the camber can be such that the framework provides four shaped units to interfit with a substantially distorted hexagonal base and a united top shape, which is rectangular.

It can be seen that the framework system allows a minimal required parts but due to the geometric shape and the continuous base and top provides a strong non rectangular and enclosed structure framework able to be used in creating a climbing frame or play enclosure for children. The detent means allows the connecting cylindrical rods to be at least partially flexible and the detent means will prevent the rod slipping off the finger to cause accidental disassembly. Therefore the connector allows construction of a safe climbing frame for children.

BRIEF DESCRIPTION OF THE DRAWINGS

In order that the invention is more readily understood, the invention will be further described by way of example with reference to the accompanying drawings, in which.

DESCRIPTION OF THE PREFERRED EMBODIMENT

Figure 1:
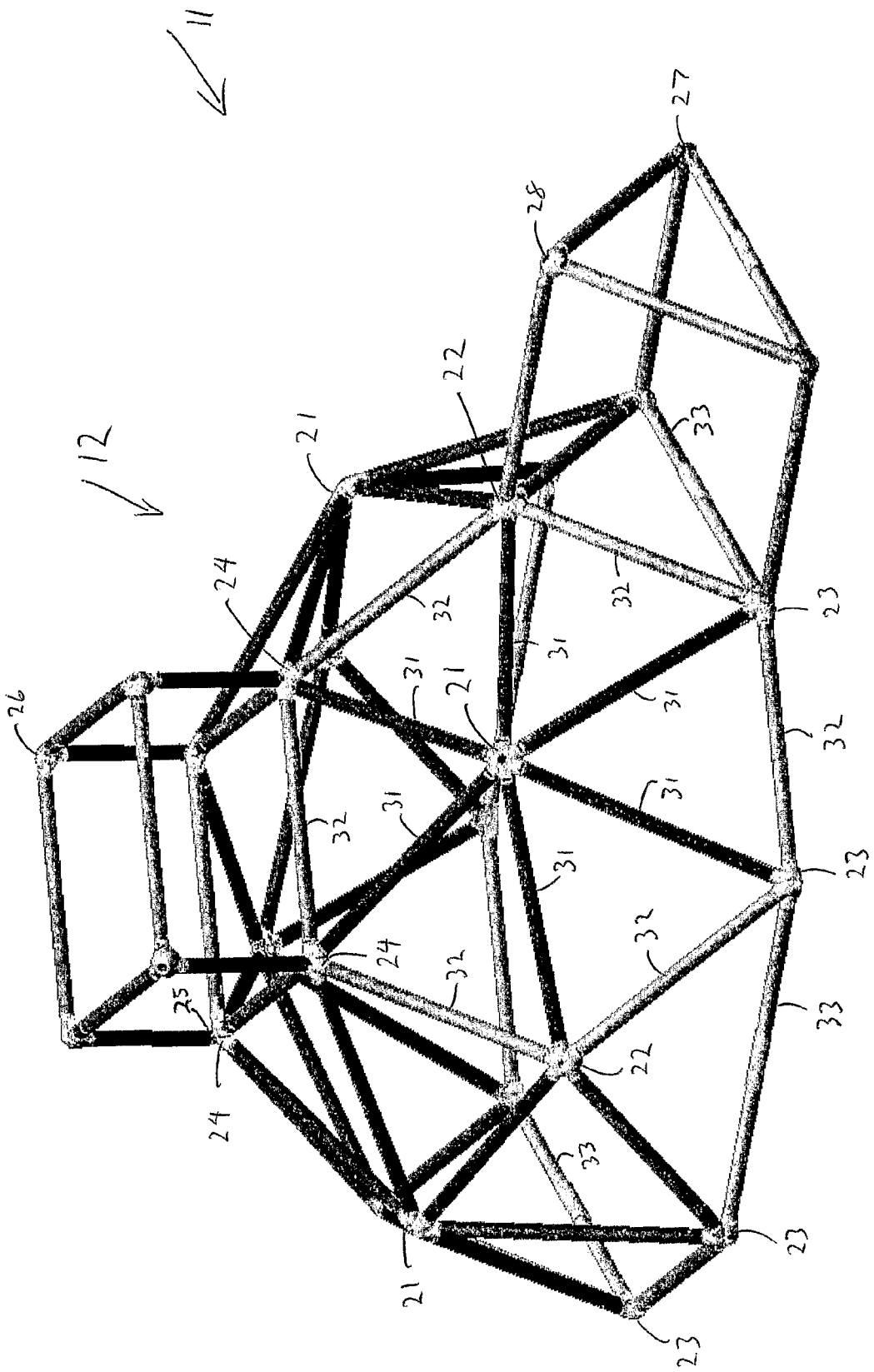
FIG. 1 is a perspective view of a first embodiment of a shaped framework formed by a framework system in accordance with the invention.
Figure 2:
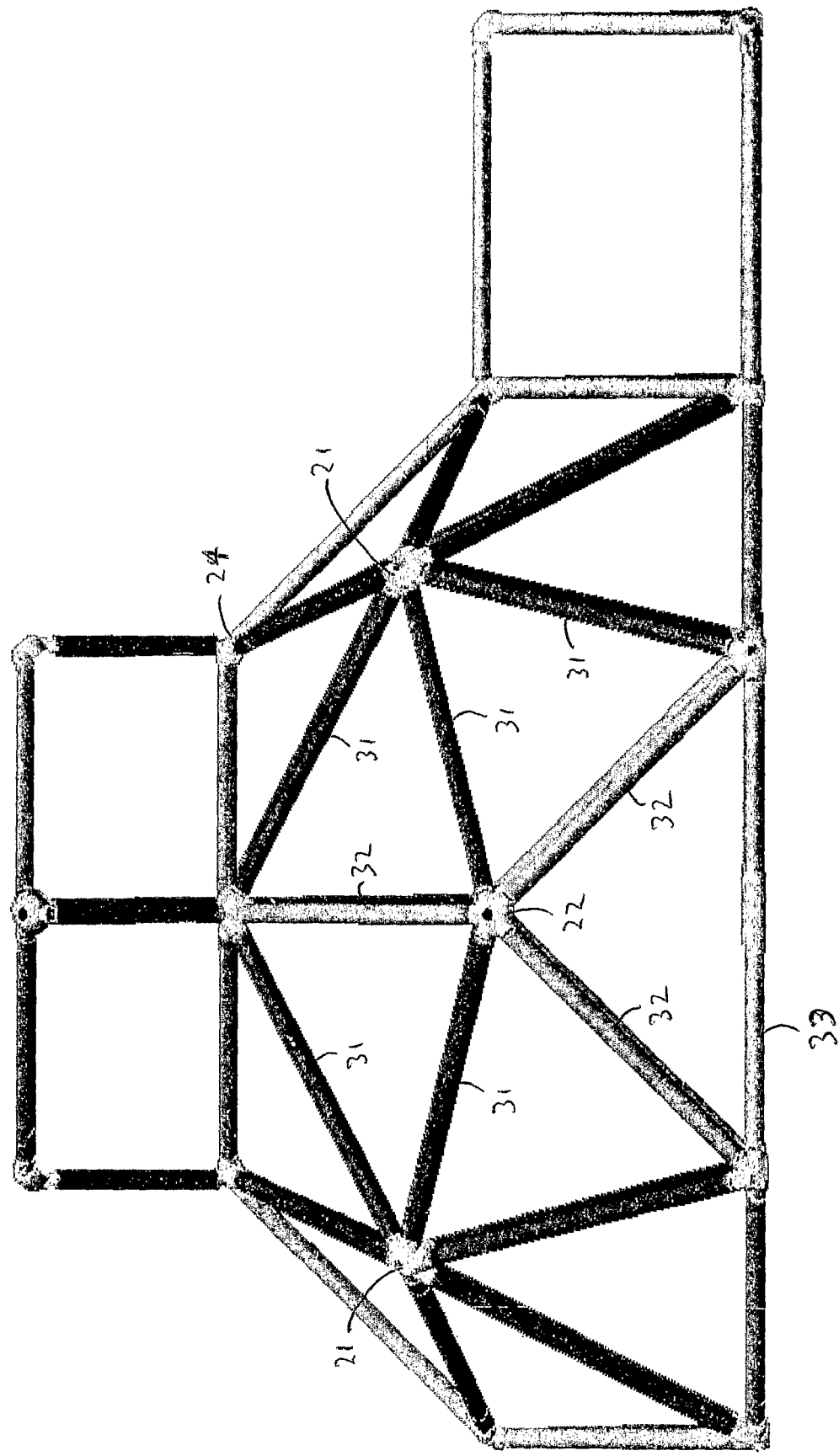
FIG. 2 is a side elevation of the shaped framework of FIG. 1.

Referring to the drawings and particularly FIGS. 1 and 2 there is shown a framework system 11 in accordance with an embodiment of the invention, which is particularly for use in construction of a climbing frame or play enclosure for children by a final consumer on behalf of the children.

The framework system comprises a number of lengths of circular cross sectional hollow cylindrical rods and novel connectors. The fingers are sized to fit within the end of hollow ended connecting cylindrical rods. The rods have a circular cross section and the fingers are formed to fit within the circular cross section.

In particular the framework system 11 has a plurality of first cylindrical connector rods 31 having a first length; a plurality of second cylindrical connector rods 32 having a second length; and a plurality of third adjustable connector rods 33 having an adjustability of length around a third length.

The lengths of the connector rods are as follows:

| Connector Rods | Length (nearest mm) | Variation of length |
| --- | --- | --- |
| First connector rods 31 | 600 | Nil |
| Second connector rods 32 | 551 | Nil |
| Third connector rod 33 | 402 | +/−5 cm adjustable thread |

The framework system also includes a plurality of connectors including first connectors 21 with six (6) equi-angular spaced radially extending fingers; a plurality of second connectors 22 being interconnection connectors with angular spaced radially extending fingers; a plurality of third connectors 23 being base connectors having a plurality of angular spaced radially extending fingers emanating from one side of the connector; and a plurality of fourth connectors 24 being top connectors having a plurality of angular spaced radially extending fingers.

Figure 3:
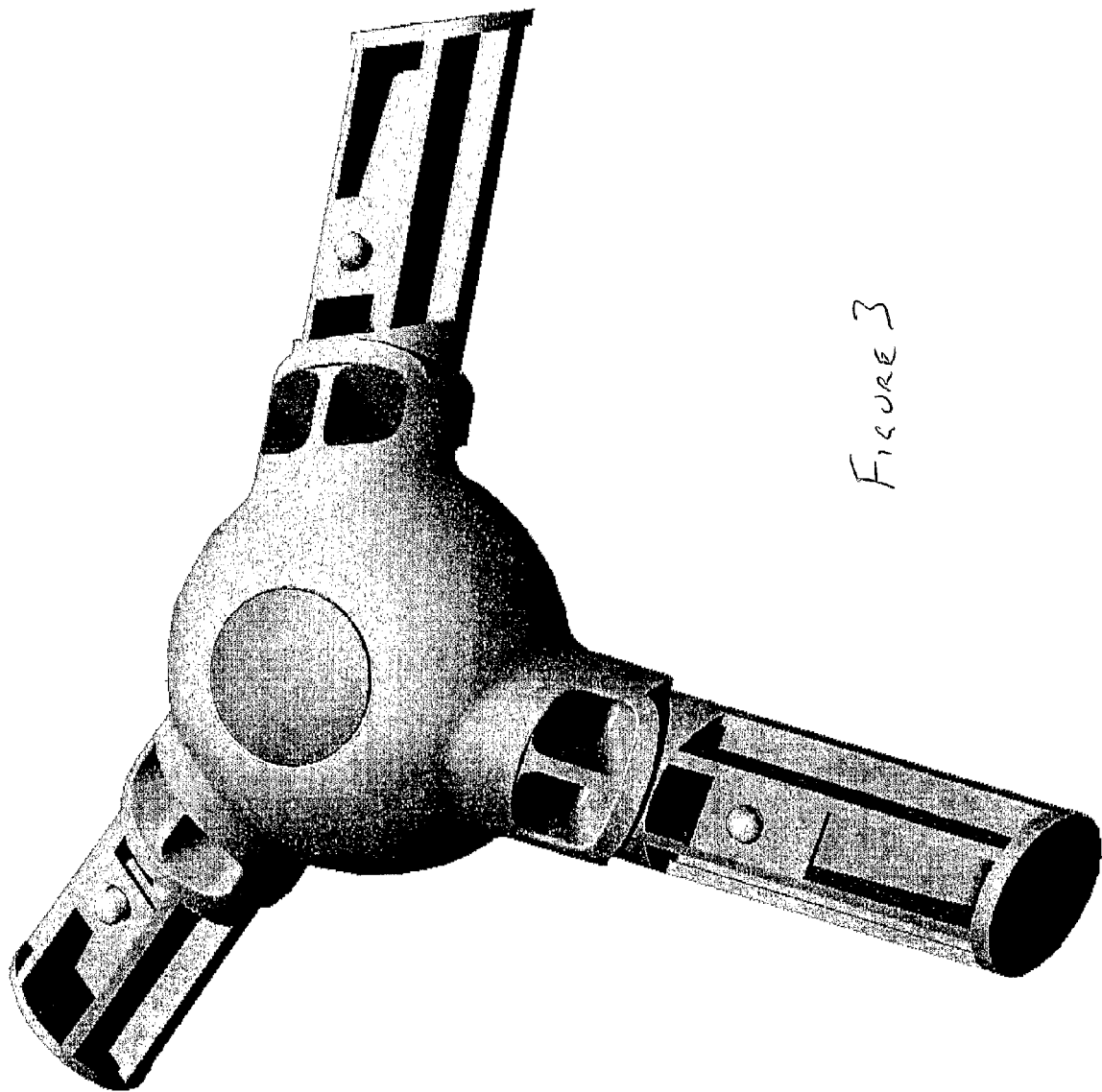
FIG. 3 is an overhead perspective view of a first three fingered connector in accordance with an embodiment of the invention for forming the shaped framework of FIG. 1.
Figure 4:
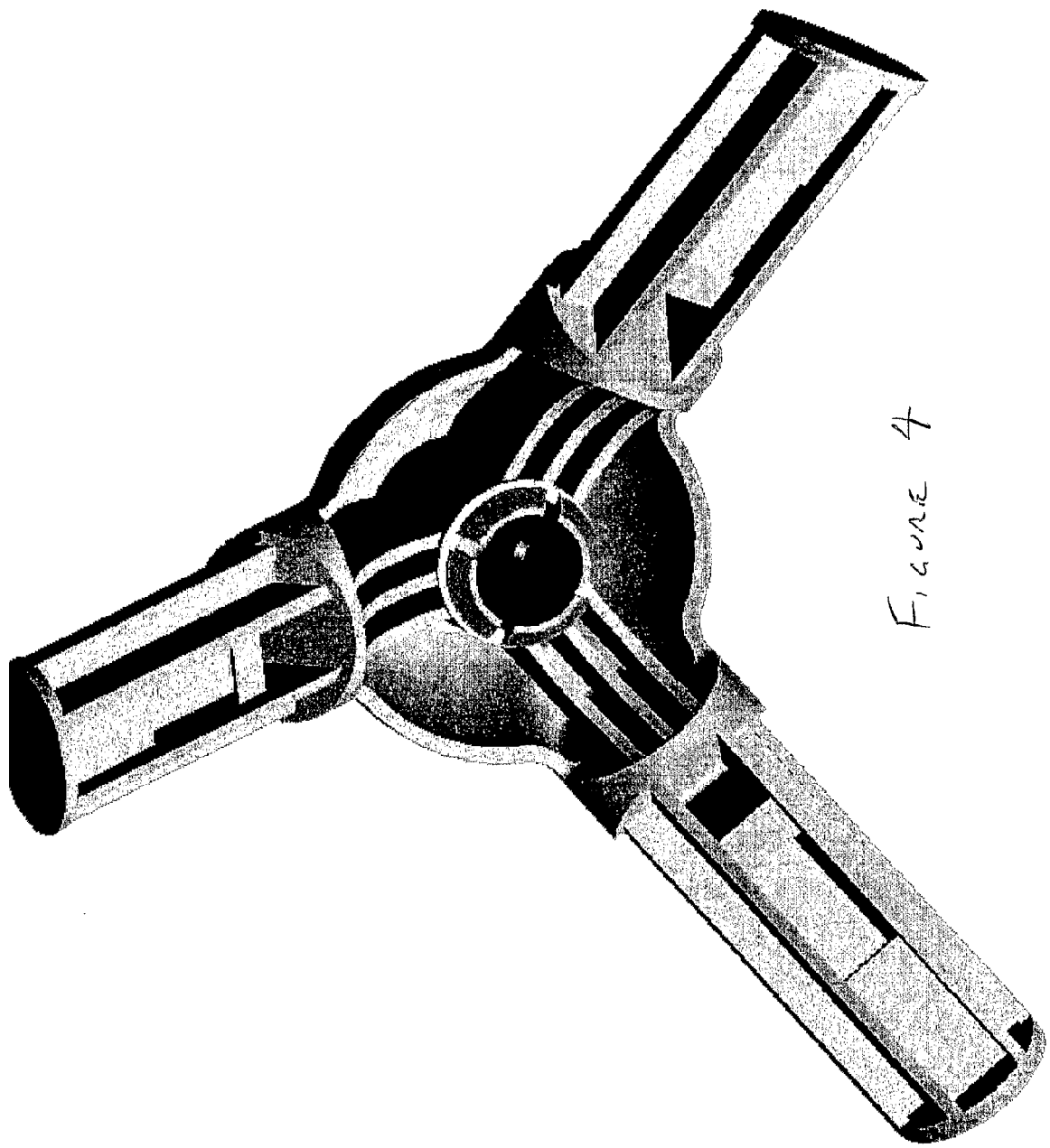
FIG. 4 is an underneath elevation of the first three fingered connector of FIG. 3.
Figure 5:
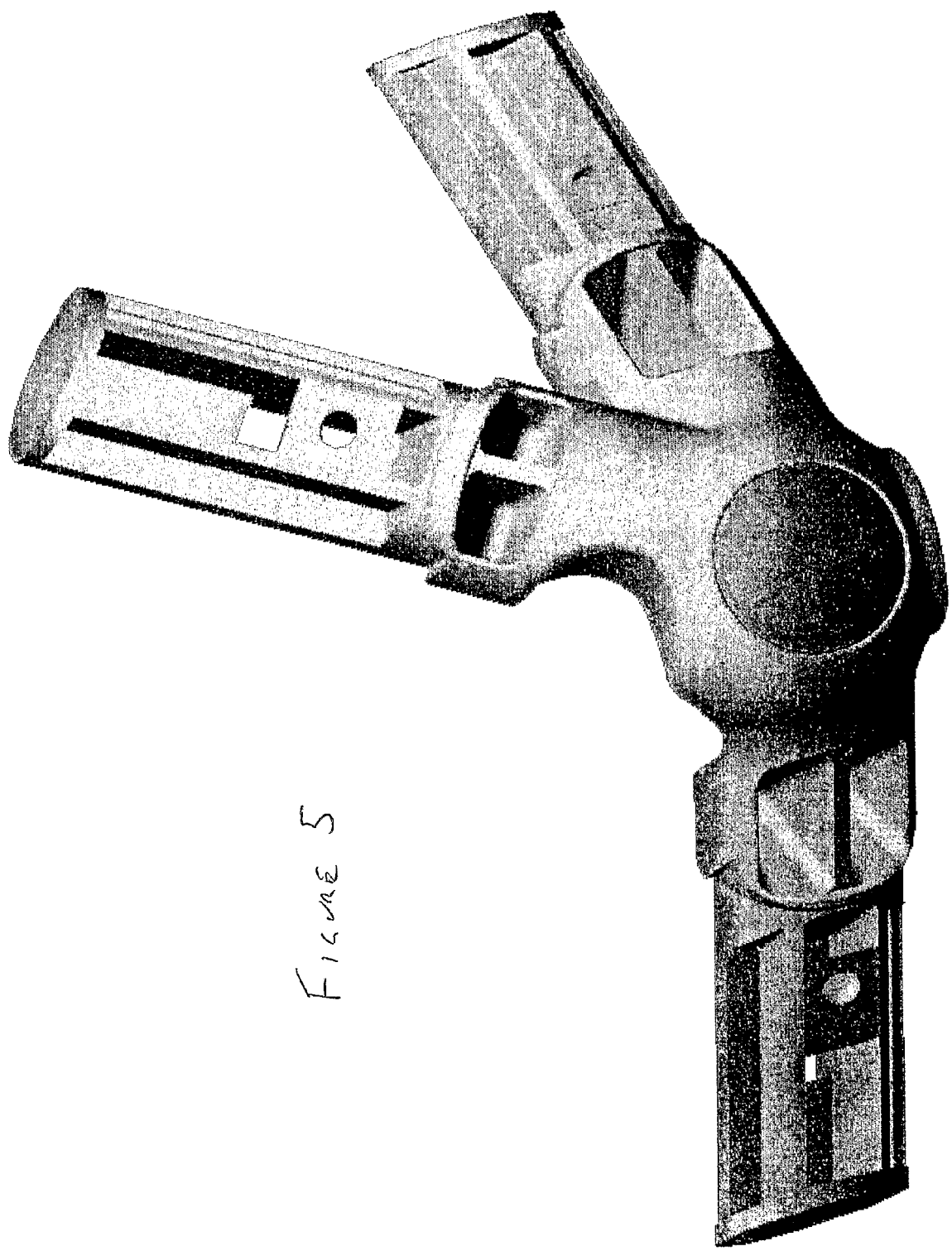
FIG. 5 Is an overhead perspective view of a second three fingered connector forming a 45° base corner in accordance with an embodiment of the invention for forming the shaped framework of FIG. 1.
Figure 6:
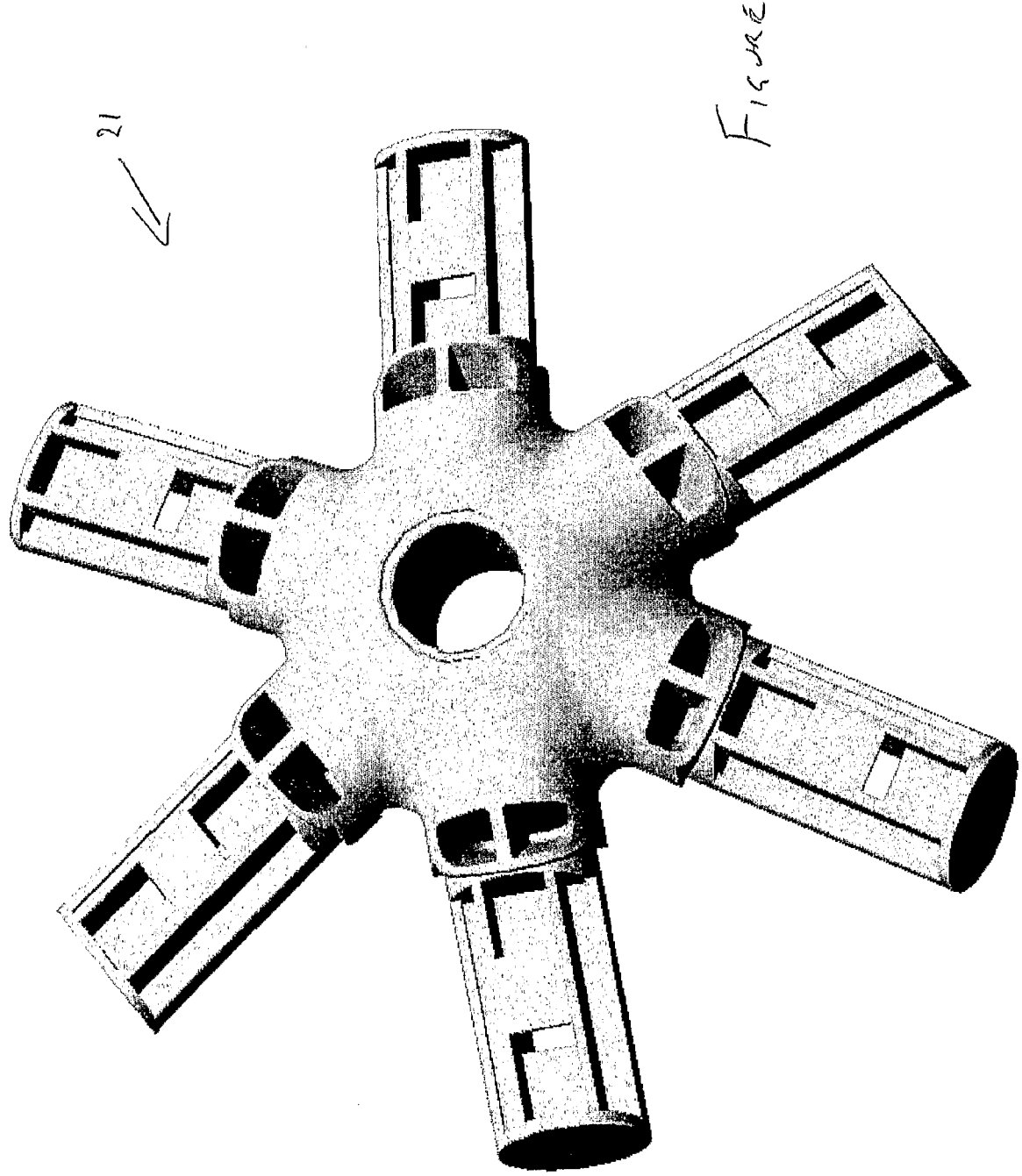
FIG. 6 is an overhead perspective view of a third six fingered connector in accordance with an embodiment of the invention for forming the shaped framework of FIG. 1.
Figure 7:
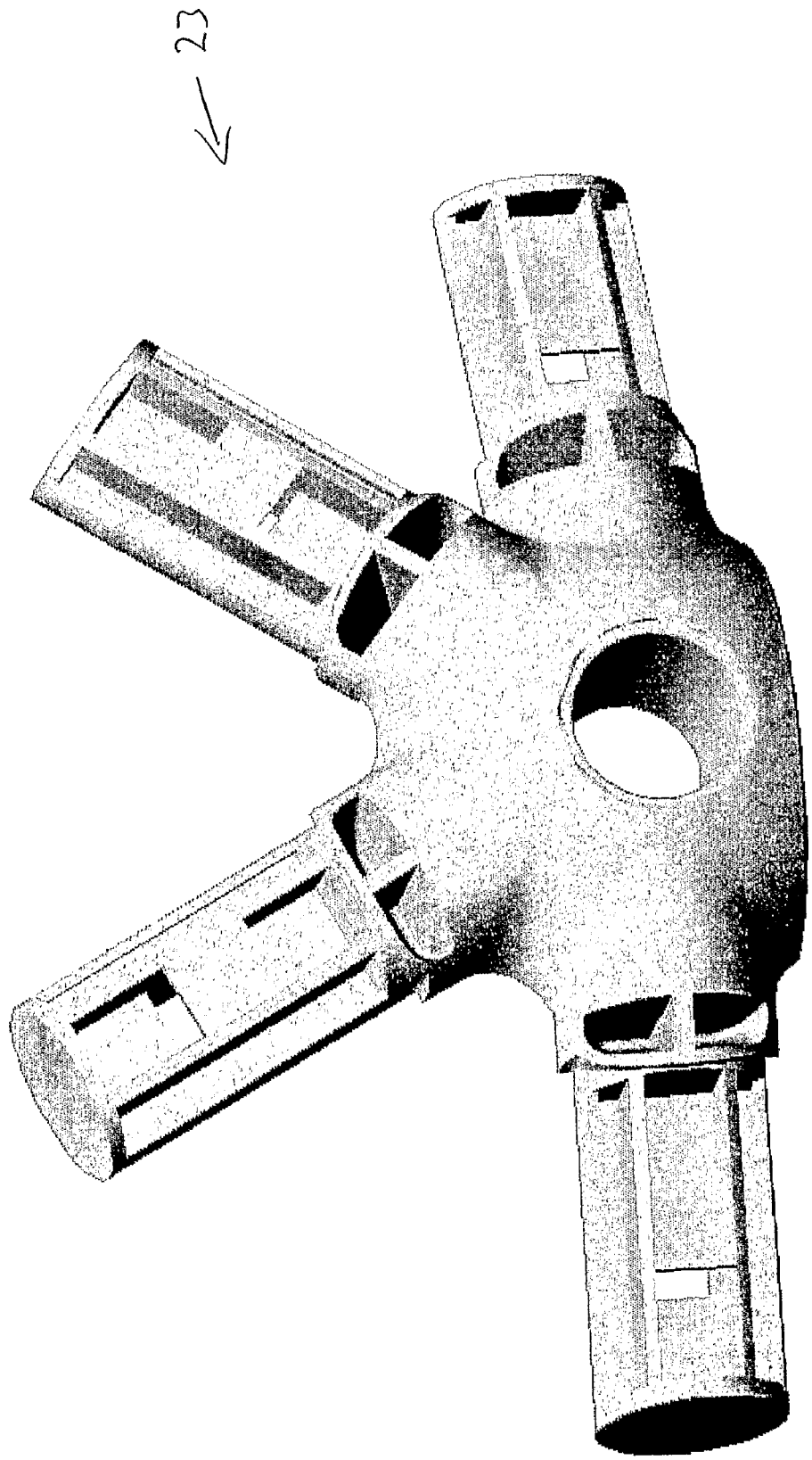
FIG. 7 is an overhead perspective view of a fourth four fingered connector forming a base connector in accordance with an embodiment of the invention for forming the shaped framework of FIG. 1.

Each connector has a central shaped body which is a substantially hollow hemispherical shape having a plurality of emanating fingers with each finger having a shape able to interfit with the end of a connecting cylindrical rod. From above such as in FIG. 3 each finger appears to protrude from a circumferential part of the central circular shaped body. However, from below as shown in FIG. 4 the fingers include a portion of ribbing extending radially from a central opening of the inner side of the hemispherical shape. In this way the linear radially extending fingers including the ribbing and the hemispherical shape form a strong low weight connector with strength both along the radial direction and between the radial directions of the fingers.

The various connectors have various angularly spaced radially extending fingers. The angles (to the nearest degree) between them are as follows:

| Connector | No. of fingers | radially angular spacing | Camber |
| --- | --- | --- | --- |
| First connectors (21) | 6 | All 60° | All 22° |
| Second connectors (22) | 5 | 66°, 66°, 66°, 66°, 96° | 39°, 38°, 18°, 17°, 18° down respectively |
| Third connectors (23) | 4 | 48°, 66°, 66°, 180° | 27°, 19°, 18°, 19° down respectively |
| Fourth Connector (24) being Combination Connector of Second connector (22) and extension connector (25) | 6 | 66°, 66°, 66°, 66°, 96 + 90 degree vert post | |

The fingers further extend at a constant camber angle to a plane normal to the axis of the connector, the fingers allowing connection to the connector rods. As shown in FIG. 3 each of the fingers extends partially downwards at a constant angle. That camber angle is about 20 degrees.

Figure 8:
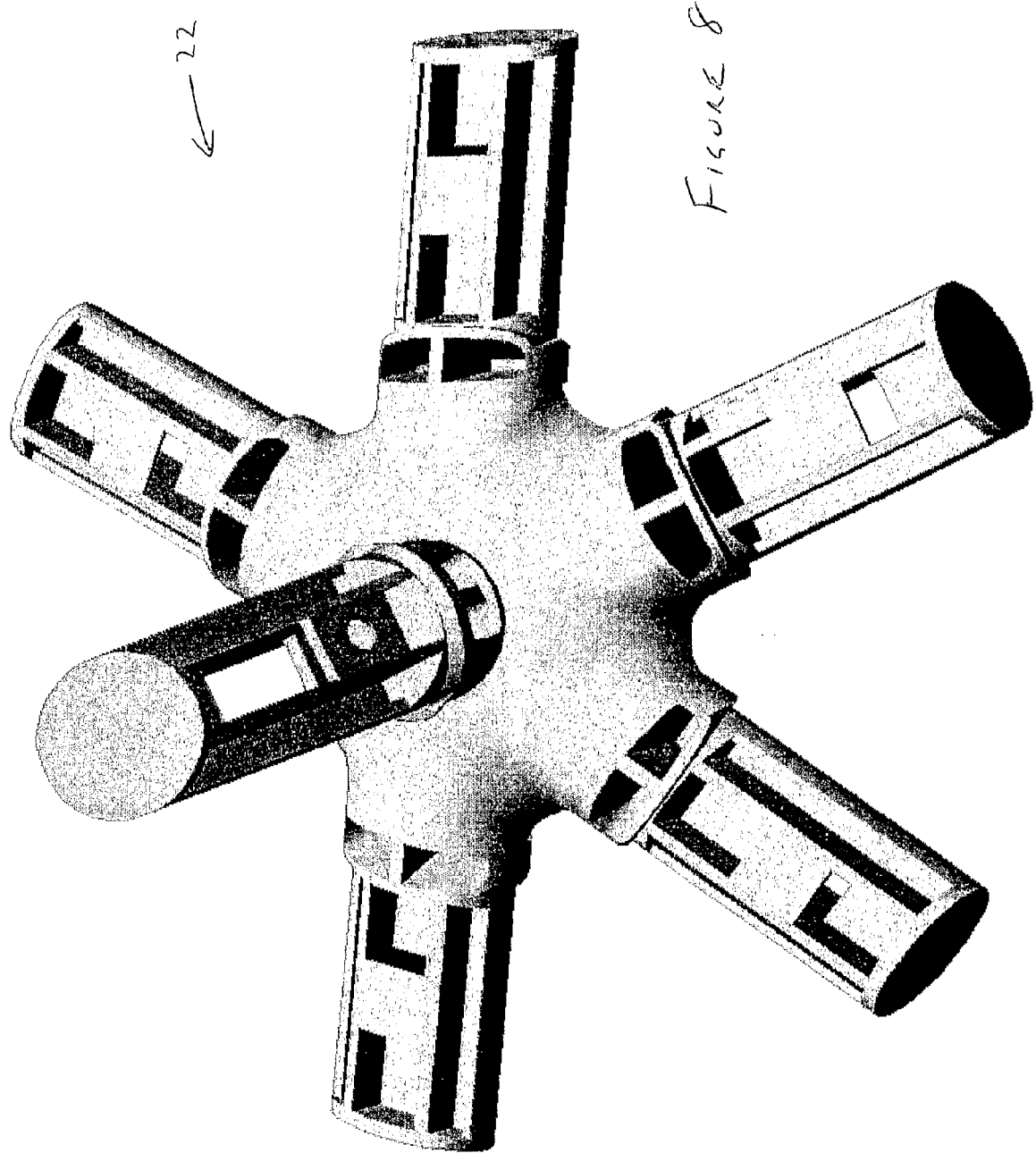
FIG. 8 is an overhead perspective view of a fifth five fingered connector with extension elbow connector in accordance with an embodiment of the invention for forming the shaped framework of FIG. 1.
Figure 9:
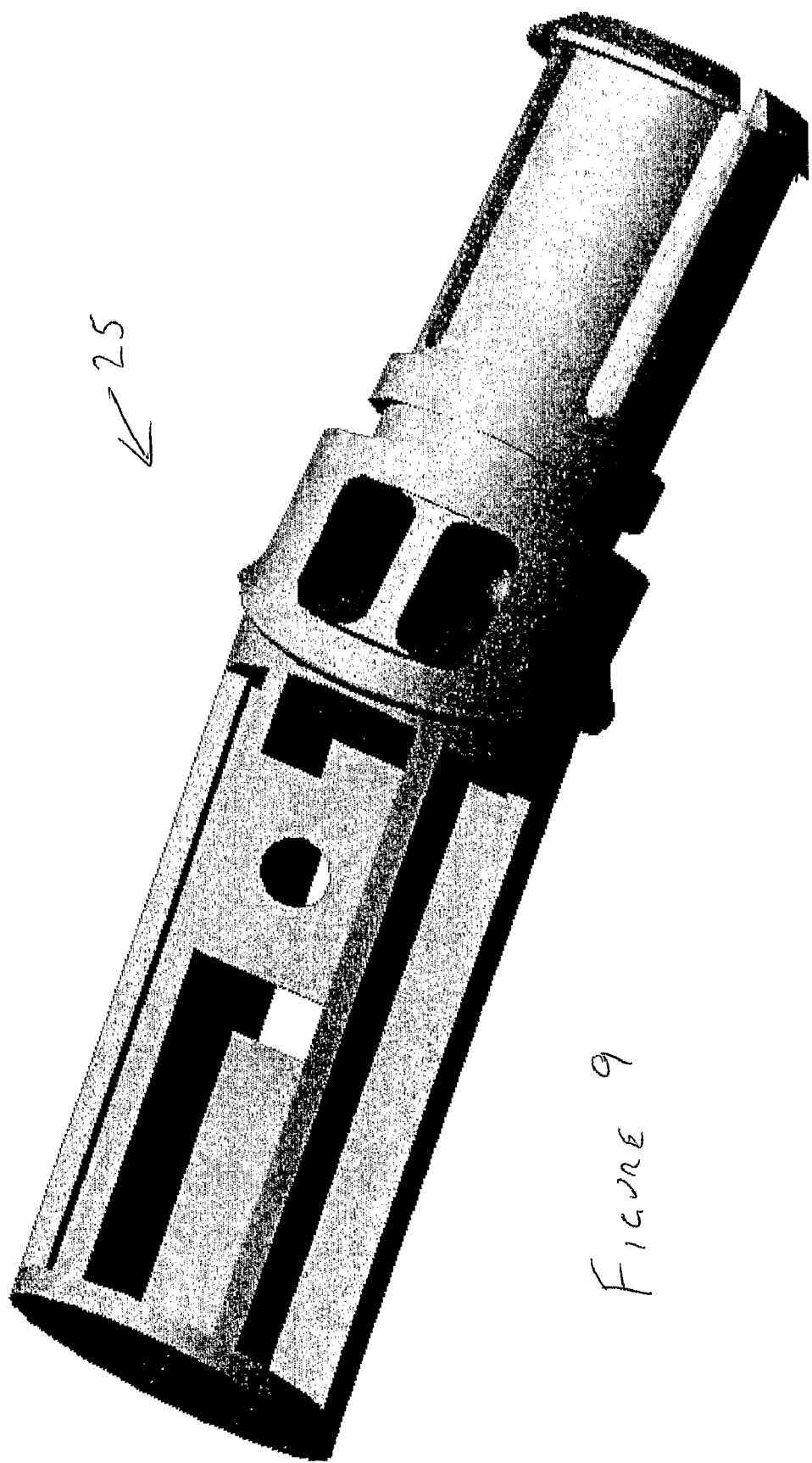
FIG. 9 is an overhead perspective view of an extension elbow connector as used in FIG. 8 in accordance with an embodiment of the invention for forming the shaped framework of FIG. 1.

There are other ancillary connectors 25, 26 27 and 28, which perform ancillary functions. For example ancillary connector 25 is an elbow joint such as shown in FIG. 9 and in effect only comprises the camber angle and allows for insertion in central body opening as shown in FIG. 8 for providing an extension element. That extension element can be an addition of a box on top of the shaped framework 12 as shown in FIG. 1. Other ancillary connectors can complete the addition of triangular or rectangular extensions.

Each finger further has a spring mounted detent allowing for sliding of the finger into engagement with the end of the connecting cylindrical rod and receiving of the detent into a recess or opening at the end of the connecting cylindrical rod for selectively retaining the connection of the connecting cylindrical rod with the connector. The detent means will prevent the connector rod slipping off the finger to cause accidental disassembly. Therefore the connector allows construction of a safe climbing frame for children.

The detent is achieved by means of a resilient means mounted between radially extending ribbing of the fingers and connected to the protruding button which extends outwardly from the cylindrical circumferential extremities of the finger to engage an opening in the side of a hollow cylindrical end of connecting rod, thus preventing relative sliding movement of the rod and finger of the connector for accidental disassembly. The resilient means is a spring means in the form of a folded plastic element having an acute expanded angle as the rest position but the material allowing resilient compression to a compressed angle until released. Each finger can include a ribbing structure for receiving therebetween in sliding mode said folded plastic element.

In use the final consumer uses the framework system to form a framework shape 12 by the following steps:

1. a plurality of first connector rods of first constant length are attached to a first 6 fingered connector with each finger equally radially separated but with constant camber to form a spider arrangement;
2. two of the second base connectors connect to two separate adjacent unattached distal ends of the connected spider arrangement to form a ground engaging base of the spider arrangement;
3. two of the third interconnecting 5 finger connectors connect to the two laterally opposite unattached distal ends of the connected spider arrangement to allow attachment to adjacent spider arrangements;
4. and two of the fourth top connectors connect to the ends of adjacent top unattached distal ends of the connected spider arrangement;
5. six of the first connector rods having second length are connected between the connectors at the unattached distal ends of the connected spider arrangement to form a geometric hexagonal shaped unit with connectors able to interconnect with other adjacent connector rods;
6. steps 1 to 5 are repeated to form an identical structure;
7. the two structures are leant back to back such that the camber forms two concave shapes closing together like a clam shell but remaining spaced at the top
8. the spaced tops are connected together by two first connector rods to maintain the two concave shapes a fixed distance at the top;
9. steps 1 and 2 are repeated twice more to form two further spider forms with concave forms;
10. the two adjacent base connectors of each spider are each respectively joined by a second connector rod of second length to form ground engaging base;
11. the two separate adjacent unattached top distal ends of each of the connected spider arrangements are attached to opposite top connectors of the first and second joined geometric hexagonal shaped units;
12. the two separate adjacent unattached lateral distal ends of each of the connected spider arrangements are attached to opposite lateral interconnecting connectors of the first and second joined geometric hexagonal shaped units to thereby form four concave geometric hexagonal shaped units leaning towards each other and joined at a top position in a rectangular shape and joined at a lateral mid point to each other;
13. the spaced bases of each of the four concave geometric hexagonal shaped units due to the lean are then joined by third connectors of third length to form a continuous base; however to ensure tightness of the link and not rely on the flexibility of the connector rods the third connectors are extendible to be able to be placed between base connectors and then expanded;
14. other ancillary shapes can be added.

Figure 10:
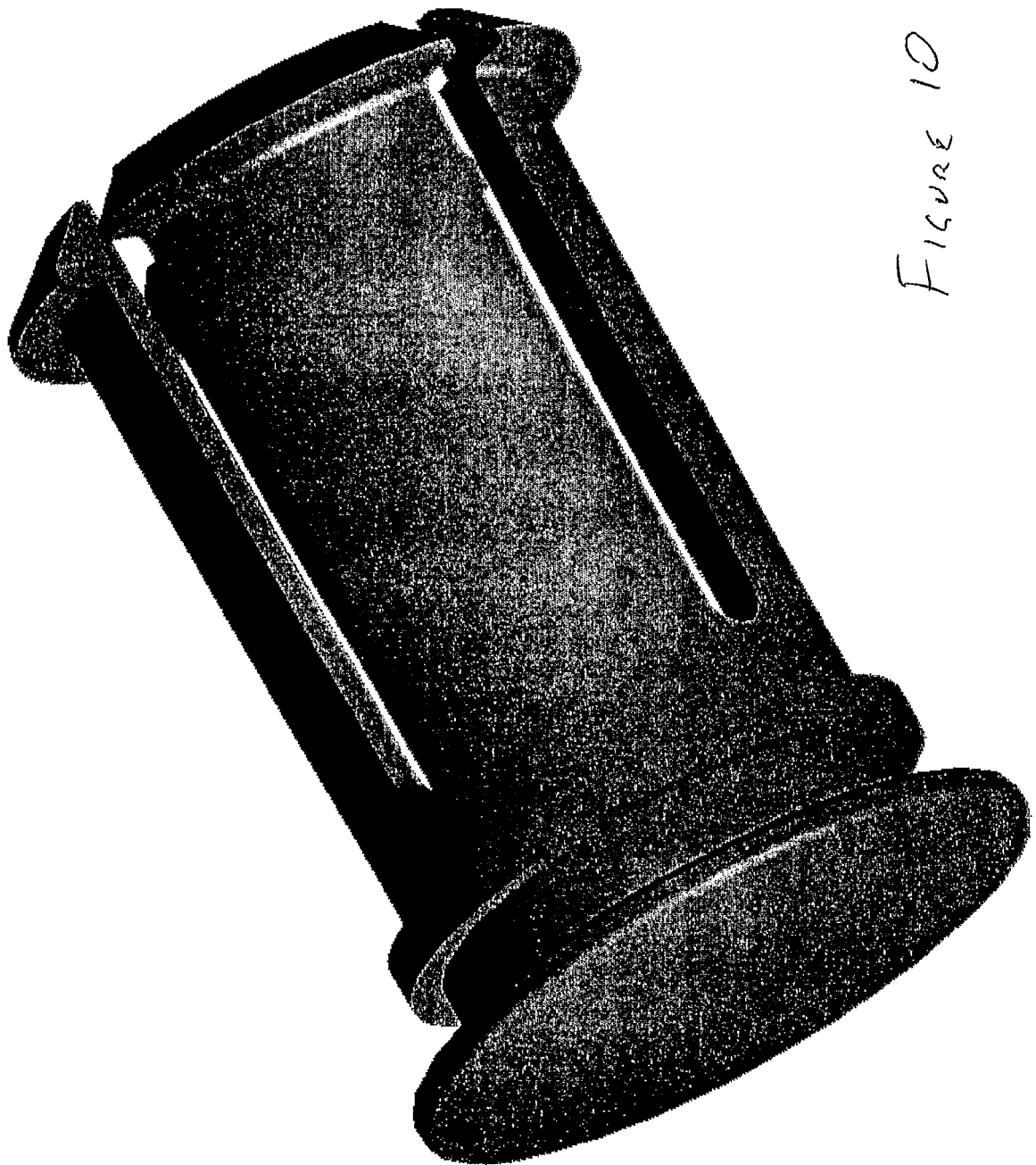
FIG. 10 is an overhead perspective view of a plug for insertion into a connector in accordance with an embodiment of the invention for forming the shaped framework of FIG. 1.

The connectors each include an opening for receiving a plug or extension member, centrally located in the connector body with peripherally emanating fingers. The plug as shown in FIG. 10 is inserted into the connector opening and has a cover disc mounted on a neck portion that can frictionally interfit in the centrally located connector opening. The plug further has a cylindrical body sized smaller than the cover disc and the frictional engaging neck and having spaced longitudinal slits to form resilient deformable legs. The legs can assist in resiliently holding material in the connector opening such that the framework provides a skeleton, which is covered and provides shaped play enclosure for children. By particular printed material a theme structure can be readily constructed.

It can be seen in this embodiment that the fourth connector uses the second connector with an extension joiner from the centre. Further the third base connectors have a left or right orientation dependent on whether the large angle is to the left or right. The base connectors in this embodiment need to be fitted alternatively with either a left or right orientation third base connectors around the base.

It should be understood that the above description is of a preferred embodiment and included as illustration only. It is not limiting of the invention. Clearly variations of the framework system would be understood by a person skilled in the art without any inventiveness and such variations are included within the scope of this invention as defined in the following claims.

The invention claimed is:
1. A framework system comprising:
a plurality of first cylindrical connector rods having a first length;
a plurality of second cylindrical connector rods having a second length;
a plurality of third adjustable connector rods having an adjustability of length around a third length;
a plurality of first connectors with constant angularly-spaced radially extending fingers and a constant camber angle to a plane normal to an axis of the first connector, the fingers shaped allowing connection to the connectors rods;
a plurality of second connectors being interconnection connectors with angularly-spaced radially extending fingers and constant camber angle to a plane normal to an axis of the second connector, the fingers allowing connection to the connectors rods;
a plurality of third connectors being base connectors having a plurality of angularly-spaced radially extending fingers emanating from one side of the third connector and constant camber angle to a plane normal to an axis of the third connector, the fingers allowing connection to the connectors rods;
one or more fourth connectors being top connectors having a plurality of angularly-spaced radially extending fingers emanating from central body with a constant camber angle to a plane normal to an axis of the fourth connector, the fingers allowing connection to the connectors rods;
a central circular shaped body with fingers radially emanating at a predefined radial angle between fingers and each finger at a predefined constant camber angle from a plane normal to the axis of the central circular shaped body;
wherein the framework system allows a plurality of first connector rods to be attached to a first connector and a plurality of second and third connectors connected to the ends of the first connector rods and connected therebetween by a plurality of second connector rods to form a geometric shaped unit with base connectors at the base of the geometric shape for resting on the ground;
and interconnecting connectors allowing a plurality of said geometric shaped units to interconnect laterally wherein the constant camber forms an enclosed framework shape;
and allowing for third adjustable connector rods to fit between the base connectors of adjacent geometric shaped units to form a continuous enclosed linear base extending in a plane;
and allowing for one or more fourth top connectors to connect a top portion of the adjacent geometric shaped units to form a united top shape;
wherein the continuous closed base and interconnected geometric shaped units and the united top shape provide structural integrity to the framework system; and wherein the fingers can protrude from a circumferential part of the central circular shaped body and the fingers include a portion of ribbing extending radially from a more central portion of the inner side of the hemispherical shape and wherein the detent is a resilient means mounted between radially extending ribbing of the fingers and connected to a protruding button which extends outwardly from the cylindrical circumferential extremities of the finger to engage an opening in the side of a hollow cylindrical end of connecting rod, thus preventing relative sliding movement of the rod and finger of the connector for accidental disassembly.

2. A framework system according to claim 1 wherein the connectors are retained in connection with the connector rods by interconnecting detent means.

3. A framework system according to claim 1 wherein the shaped unit is a hexagon and the camber is such that the framework provides four shaped units to interfit with a substantially distorted hexagonal base and a united top shape which is rectangular.

4. A framework system according to claim 1 having a connector for use in creating the framework having a particular shaped framework formed by a plurality of connectors and a plurality of detachable connecting cylindrical rods for connecting between spaced connectors, the connector having:
  a body portion having a plurality of emanating fingers with each finger having a shape able to interfit with the end of a connecting cylindrical rod; and
  each finger further having a spring mounted detent allowing for sliding of the finger into engagement with the end of the connecting cylindrical rod and receiving of the detent into a recess or opening at the end of the connecting cylindrical rod for selectively retaining the connection of the connecting cylindrical rod with the connector.

5. A framework system having a connector according to claim 1 wherein the fingers are sized to fit within the end of hollow ended connecting cylindrical rods and wherein the rods have a circular cross section and the fingers are formed to fit within the circular cross section.

6. A framework system having a connector according to claim 4 wherein the detent means comprises a protruding button able to interfit into a recess or opening in the hollow ended connecting cylindrical rods.

7. A framework system having a connector according to claim 1 having a plurality of fingers wherein the number of fingers is two, three, four, five or six fingers to accommodate a variety of angles of interconnection of cylindrical connecting rods.

8. A framework system having a connector according to claim 7 wherein fingers on a single connector emanate from the connector body at a constant camber angle and are protruding at inter radial angle of 72°, 60° or 45° in order to form substantially pentagonal, hexagonal or octagonal based frameworks respectively.

9. A framework system having a connector according to claim 8 wherein the camber angle for each finger is a consistent angle to a plane normal to the axis of the central circular body and is in the range of 15° to 30°.

10. A framework system having a connector according to claim 7 wherein the resilient means is a spring means.

11. A framework system having a connector according to claim 10 wherein the spring means is a folded plastic element having an acute expanded angle as the rest position but the material allowing resilient compression to a compressed angle until released.

12. A framework system having a connector according to claim 11 wherein each finger includes a ribbing structure for receiving therebetween in sliding mode said folded plastic element.

13. A framework system having a connector according to claim 1 including an opening for receiving a plug or extension member.

14. A framework system having a connector according to claim 13 wherein the opening is centrally located in the connector body with peripherally emanating fingers.

15. A framework system having a connector according to claim 14 wherein the plug insertion into the connector opening is a cover disc mounted on a neck portion that can frictionally interfit in the centrally located connector opening and wherein the plug insertion further has a cylindrical body sized smaller than the cover disc and the frictional engaging neck and having spaced longitudinal slits to form resilient deformable legs wherein the legs assist in resiliently holding material in the connector opening.

16. A framework system having a connector according to claim 1 having a connector opening for receiving collapsible framework with material attached providing an extension upwardly of the framework that readily expands to provide a shaped enclosure but upon any weight will collapse and therefore not provide an extension of the structure for further climbing.

17. A framework system having a connector according to claim 16 wherein the opening of connectors the framework system is of a form that selectively can receive any one of a plug, an extension elbow or a collapsible framework.

* * * * *